Jan. 22, 1924.
R. O. ALLEN
1,481,334
CONNECTING ROD CONSTRUCTION
Filed Sept. 28, 1922
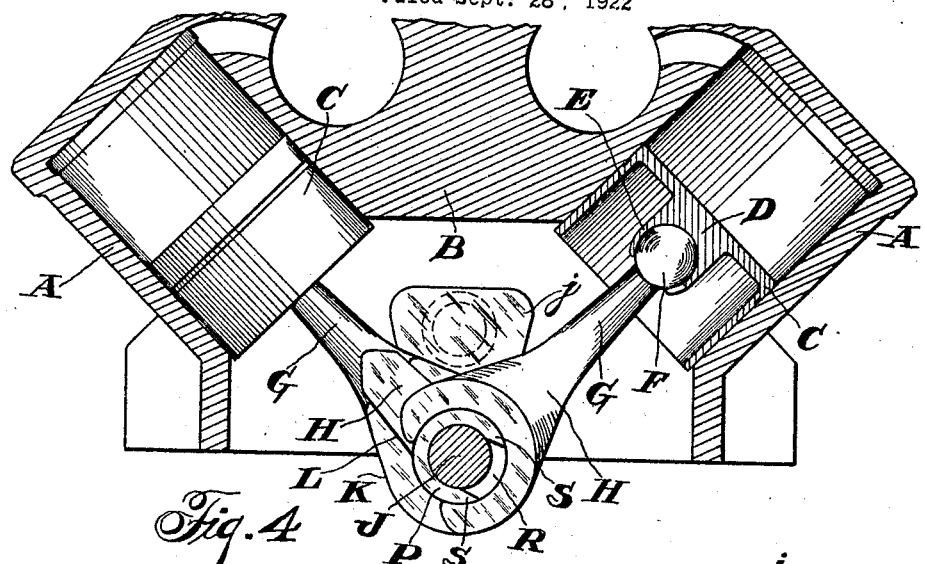
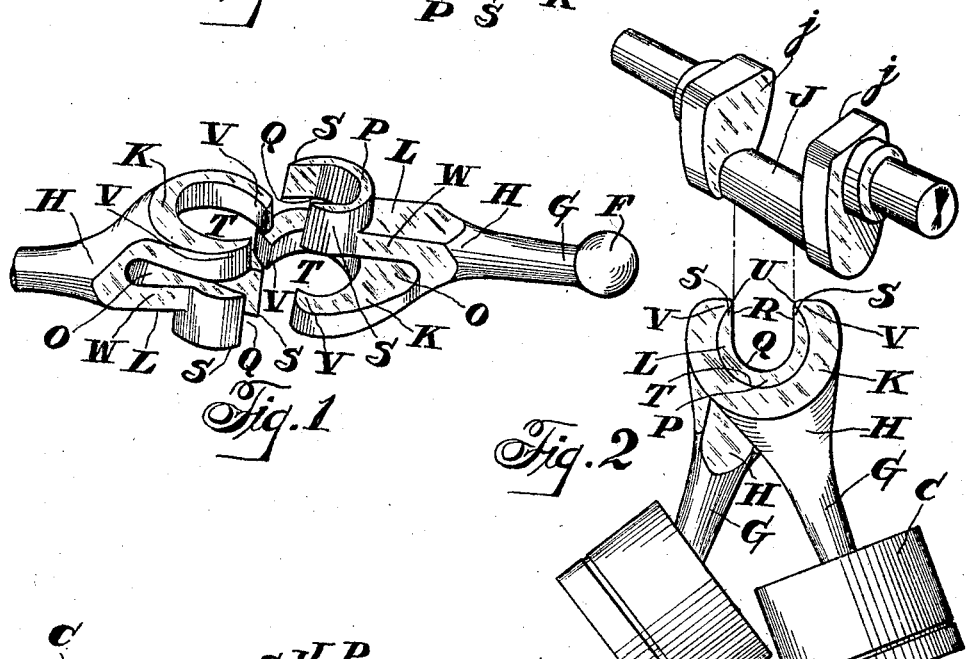
INVENTOR
Roy O. Allen
BY
Herbert L. Ogden
HIS ATTORNEY Patented Jan. 22, 1924.

1,481,334

UNITED STATES PATENT OFFICE.

ROY O. ALLEN, OF ATHENS, PENNSYLVANIA, ASSIGNOR TO INGERSOLL-RAND COMPANY, OF JERSEY CITY, NEW JERSEY, A CORPORATION OF NEW JERSEY.

CONNECTING-ROD CONSTRUCTION.

Application filed September 28, 1922. Serial No. 591,045.

*To all whom it may concern:*

Be it known that I, ROY O. ALLEN, a citizen of the United States, and a resident of Athens, in the county of Bradford and State of Pennsylvania, have invented a certain Connecting-Rod Construction, of which the following is a specification accompanied by drawings.

This invention relates generally to fluid actuated rotary tools, such as drills, grinders, and the like, equipped with a motor provided with a plurality of radially located opposed cylinders, which are usually arranged in pairs having pistons connected to common crank pins, for imparting rotative movement to the drill, emery wheel, brush or other operative part to be actuated, but the invention relates more particularly to the pivotal connections between the crank pins and the connecting rods of opposed cylinders.

The connection of a plurality of oppositely acting connecting rods to the same crank pin, especially in cases where the crank is formed in one piece, has heretofore necessitated the use of pins, bolts, nuts and divers other devices for securing the pivotal connections to the crank pins, many of such constructions being subject to loosening and breakage of parts.

One object of the present invention is to so construct the connecting rods and pivotal connections that separate fastening or securing devices will not be required, the pivotal connections being so formed that they cooperate to lock each other about the crank pin, hence reducing the number of parts of the engine. A further object is to form the pivotal ends of all the connecting rods exactly alike, so that they are readily interchangeable, the connections being so shaped that in certain positions opposing connections will interlock with each other, one thus holding the other in position on the crank pin. A still further object is to simplify and improve the construction of the connecting rods so that assembly and disassembly of the parts is facilitated. Still further objects will later appear, and to all these ends the invention consists in the features of construction described in the following specification and illustrated in the accompanying drawings forming a part hereof, in which—

Figure 1 is a perspective view of a pair of opposed connecting rods about to be interlocked prior to connection with the crank shaft;

Figure 2 is a perspective view of the crank pin, connecting rods and pistons with the pivotal connections interlocked and turned in the proper position to permit the insertion of the crank pin between the prongs of the connections;

Figure 3 is a longitudinal end view showing the opposed connecting rods partially turned upon the crank pin to lock the connections upon the pin, and Figure 4 is a side view partly in longitudinal section of a portion of a motor for a rotary drill selected as a type to illustrate the invention, with the connecting rods rotated slightly further than shown in Figure 3 to final assembled position.

Referring to the drawings, a plurality of cylinders A are arranged in opposed relation in the casing B and suitable pistons C are adapted to operate within the cylinders A. The pistons C are preferably hollow and are provided with inwardly extending portions D having sockets E for receiving the ball ends F of the connecting rods G. The pistons and connecting rods are set at an angle to each other and the rods G have identically formed pivotal or toggle ends H adjacent to the crank, which are adapted to be secured in interlocking relationship about the crank pin J located between the bearings *j* in the manner herein described.

The pivotal or toggle ends H of the connecting rods G are identically formed in the respect that the connections for each rod consist of a pair of claws or prongs, including a larger claw K and a smaller claw L. The claws K and L are of substantially equal thickness and the width of the longitudinal opening between the claws K and L indicated at O is substantially equal to the thickness of the claws K and L.

The smaller claw L is substantially in alignment with the longitudinal axis of the connecting rod G and the larger claw K is offset relatively to the claw L, the extent of said offset defining the width of the longitudinal opening O between the claws.

The smaller claw L is formed with and includes a transversely extending offset claw or bearing portion P. The offset portion P is substantially circular in external contour and has an opening Q transverse to the axis of the rod G, this opening Q extending through the claw L and being open at the end, as shown at R, so that opposite prongs S are formed. The total width of the prongs S and claw portion L is substantially equal to twice the thickness of the larger claw K.

The larger claw K is formed with a substantially circular opening T also open at the end, as shown at U, so that opposite prongs V are formed. The opening T of the larger claw K is concentric with the opening Q of the smaller claw L and offset portion P, and the opening T is of a diameter sufficient to embrace the offset portion P of the opposite connecting rod when the pivotal connections are interlocked as well as during assembly or disassembly of the parts. The width of the claw L at the point of juncture with the periphery of the offset portion P is substantially equal to but preferably slightly less than the distance between the prongs V of the larger jaw so that this portion of the claw L may pass freely transversely between the prongs V during the assembly or disassembly of the parts.

The connecting rods and crank pin are assembled in an exceedingly simple and novel manner. The symmetrically formed complementary toggle connections are first placed in opposed relation as shown in Figure 1, so that the large claw K of one rod and the smaller claw L of the other rod are directly opposite. The larger offset claw K of each rod is then aligned with the longitudinal opening O between the two claws K and L of the opposite rod and are passed longitudinally into the openings O until the smaller claws are in superimposed alignment with, but separated from, each other by the larger claws K, and the larger claws K are also in alignment directly adjacent to each other. In this position the smaller claws define a cylindrical aperture of approximately the same diameter as the offset portions P. At this juncture also, the flat sides W of the claws L at the point where they meet the outer periphery of the offset portions P should be aligned with the openings between the claws V. The connecting rods may then be moved transversely toward each other, the smaller claws L sliding into the openings T of the larger claws K and the flat sides W of the claws L sliding past the ends V of the claws K, until the claws L meet each other and the larger claws K embrace the offset portions P. The claws L, instead of the claws K, are now aligned with the longitudinal openings O of the respective rods, and the rods are interlocked with each other against relative longitudinal movement, as shown in Figure 3.

The breaks U and R in the openings T and Q of the connecting rods K and L, respectively, occur at the same point in the respective arcs subtended by the interior circular portions of the claws K and L. This point is located at an angle to the longitudinal axis of the connecting rod so that when the toggles are in the position indicated in Figure 3 the breaks U and R will be opposite and at an angle to each other, and the connecting rods may be turned toward each other in one direction to bring the breaks R and U in alignment with each other. An unrestricted semicylindrical opening is thus provided between the aligned claws affording provision for the insertion or removal of the crank pin J transversely past the ends of the claws within the unrestricted opening R—U as shown in Figure 2. The connecting rods may be turned toward each other in the opposite direction a slightly greater distance than indicated in Figure 3, so that the breaks of the respective jaws will be located at opposite sides of the point of convergence of the longitudinal axes of the connecting rods, when the connections will be interlocked with each other about the crank pin as seen in Figure 4, which shows the relative positions of the parts during operation of the engine. The crank pin J is engaged upon opposite sides and actuated by the smaller claws L during the reciprocatory and oscillatory movements of the connecting rods, the smaller claws L being substantially in axial alignment with the connecting rods, and the offset larger claws K rotatively engage the offset portions P of the smaller claws L. Substantial and well-balanced bearing surfaces are thus obtained, and the several breaks in the continuity of these surfaces tend to facilitate the passage of oil and supply of lubricant to all the moving parts.

I claim:

1. A connecting rod construction comprising a crank and a plurality of connecting rods, said connecting rods being adapted to be set at an angle to each other, each of said rods having a claw adapted to embrace the crank and another claw adapted to embrace the crank-embracing claw of the opposite rod, the openings between the ends of said claws permitting insertion and removal of the crank transversely past the ends of the claws.

2. A connecting rod construction comprising a crank and a plurality of connecting rods, said connecting rods being adapted to be set at an angle to each other, each of said rods having a claw adapted to embrace the crank and another claw adapted to embrace the crank-embracing claw of the opposite rod, one of said rods being adapted to retain the other in interlocking relationship about the crank in one position and adapted to be turned to another position to present an unrestricted opening affording provision for the insertion and removal of the crank.

3. A connecting rod construction comprising a crank and a plurality of opposed connecting rods having identically formed crank ends, said connecting rods being adapted to be set at an angle to each other, each of said rods having a plurality of claws, one of said claws being adapted to embrace the crank and the other claw being adapted to embrace the crank-embracing claw of the opposite rod, and having an opening between said claws adapted to accommodate one of the claws of the opposite rod, the openings between the ends of the claws being adapted to be aligned to afford means for the insertion and removal of the crank transversely past the ends of the claws.

4. A connecting rod construction comprising a crank and a plurality of opposed connecting rods having identically formed crank ends, said connecting rods being adapted to be set at an angle to each other, each of said rods having a plurality of claws, one of said claws being adapted to embrace the crank and the other claw being adapted to embrace the crank-embracing claw of the opposite rod, and having an opening between said claws adapted to accommodate one of the claws of the opposite rod, one of said connecting rods being adapted to retain the other in interlocking relationship about the crank when in operative position, said connecting rods being movable to another position to permit disconnection of the connecting rods from the crank.

5. A connecting rod construction comprising a crank, a plurality of connecting rods adapted to be set at an angle to each other, the crank ends of said rods being identically formed in the respect of each having a pair of claws, one of said claws being adapted to embrace the crank and having an offset portion and the other claw adapted to embrace the offset portion of the crank-engaging claw of the opposite rod, and having an opening between said claws adapted to accommodate said other claw in one position during assembly of said rods and a portion of said crank-embracing claw when the rods are moved to other positions, the openings between the ends of the claws permitting the insertion and removal of the crank transversely past the ends of the claws when in a certain position.

6. A connecting rod construction comprising a crank, a plurality of connecting rods adapted to be set at an angle to each other, the crank ends of said rods being identically formed in the respect of each having a pair of claws, one of said claws being adapted to embrace the crank and having an offset portion and the other claw adapted to embrace the offset portion of the crank-engaging claw of the opposite rod, and having an opening between said claws adapted to accommodate said other claw in one position during assembly of said rods and a portion of said crank-embracing claw when the rods are moved to other positions, said connecting rods cooperating to interlock with each other about the crank in operative position and adapted to be turned to another position to permit removal of the connecting rods from the crank.

7. A connecting rod construction comprising a crank, a plurality of connecting rods adapted to be set an angle to each other, the crank ends of said rods being identically formed, each having a pair of claws, said claws having concentric openings, the smaller of said claws being adapted to embrace the crank and having an offset portion, and the larger claw being adapted to embrace the offset portion of the crank-engaging claw of the opposite rod, each of said rods having an opening between the claws adapted to accommodate the larger claw in one position during assembly or disassembly of the rods, and a portion of said smaller crank-embracing claw when the rods are in other interlocked positions, the said larger claw being adapted to permit transverse passage of said smaller claw during assembly and disassembly of said rods, and each of said claws having an opening adapted to permit the insertion and removal of the crank past the ends of the claw.

8. A connecting rod construction comprising a crank, a plurality of connecting rods adapted to be set at an angle to each other, the crank ends of said rods being identically formed, each having a pair of claws, said claws having concentric openings, the smaller of said claws being adapted to embrace the crank and having an offset portion, and the larger claw being adapted to embrace the offset portion of the crank-engaging claw of the opposite rod, each of said rods having an opening between the claws adapted to accommodate the larger claw in one position during assembly or disassembly of the rods, and a portion of said smaller crank-embracing claw when the rods are in other interlocked positions, the said larger claw being adapted to permit transverse passage of said smaller claw during assembly and disassembly of said rods, the claws of one of said connecting rods retaining the other in interlocking relationship about the crank in one portion and being adapted to be turned to another position to present an unrestricted semi-cylindrical opening between the aligned jaws affording provision for the removal of the crank from said jaws.

In testimony whereof I have signed this specification.

ROY O. ALLEN.